United States Patent
Line et al.

(10) Patent No.: US 9,421,894 B2
(45) Date of Patent: Aug. 23, 2016

(54) VEHICLE SEATING ASSEMBLY WITH MANUAL INDEPENDENT THIGH SUPPORTS

(71) Applicant: Ford Global Technologies, LLC, Dearborn, MI (US)

(72) Inventors: Johnathan Andrew Line, Northville, MI (US); Christian J. Hosbach, Allen Park, MI (US); Brandon W. Nichols, Ann Arbor, MI (US); Mandeep Singh Sidhu, Canton, MI (US); Balakrishna Reddy, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 72 days.

(21) Appl. No.: 14/243,027

(22) Filed: Apr. 2, 2014

(65) Prior Publication Data
US 2015/0283931 A1 Oct. 8, 2015

(51) Int. Cl.
*B60N 2/62* (2006.01)

(52) U.S. Cl.
CPC .............. *B60N 2/62* (2013.01); *B60N 2205/30* (2013.01)

(58) Field of Classification Search
CPC .......... B60N 2/62; A47C 7/506; A47C 7/002; A47C 7/024; A47C 1/124; F16L 3/13; F16L 33/04
USPC ............ 297/284.11, 423.26, 463.1, 312, 248; 248/74.2; 24/279
See application file for complete search history.

(56) References Cited

U.S. PATENT DOCUMENTS

| | | | |
|---|---|---|---|
| 616,178 A | * | 12/1898 | Barron .......................... 297/201 |
| 2,958,369 A | | 11/1960 | Pitts et al. |
| 3,403,938 A | | 10/1968 | Cramer et al. |

(Continued)

FOREIGN PATENT DOCUMENTS

| | | |
|---|---|---|
| EP | 0754590 | 1/1997 |
| EP | 0926969 | 1/2002 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — David E Allred
*Assistant Examiner* — Alexander Harrison
(74) *Attorney, Agent, or Firm* — Vichit Chea; Price Heneveld LLP

(57) ABSTRACT

A vehicle seating assembly includes a seat base. First and second independent thigh supports are pivotally coupled to the seat base. A support rod extends below the first and second independent thigh supports and is operably coupled to each of the first and second independent thigh supports by a gasket member and a bracket. A first spring member includes a body portion in abutting contact with an underside of the first independent thigh support and includes legs engaged with the support rod. The first spring member biases the first independent thigh support to a raised position. A second spring member includes a body portion in abutting contact with an underside of the second independent thigh support and includes legs engaged with the support rod. The second spring member biases the second independent thigh support to a raised position.

15 Claims, 7 Drawing Sheets

(56) References Cited

U.S. PATENT DOCUMENTS

| | | | |
|---|---|---|---|
| 3,883,173 | A | 5/1975 | Shephard et al. |
| 3,929,374 | A | 12/1975 | Hogan et al. |
| 4,324,431 | A | 4/1982 | Murphy et al. |
| 4,334,709 | A | 6/1982 | Akiyama et al. |
| 4,353,595 | A | 10/1982 | Kaneko et al. |
| 4,541,669 | A | 9/1985 | Goldner |
| 4,629,248 | A | 12/1986 | Mawbey |
| 4,664,444 | A | 5/1987 | Murphy |
| 4,693,513 | A | 9/1987 | Heath |
| 4,720,141 | A | 1/1988 | Sakamoto et al. |
| 4,915,447 | A | 4/1990 | Shovar |
| 5,171,062 | A | 12/1992 | Courtois |
| 5,174,526 | A | 12/1992 | Kanigowski |
| 5,518,294 | A | 5/1996 | Ligon, Sr. et al. |
| 5,560,681 | A | 10/1996 | Dixon et al. |
| 5,597,203 | A * | 1/1997 | Hubbard ............... 297/284.3 |
| 5,647,635 | A | 7/1997 | Aumond et al. |
| 5,755,493 | A | 5/1998 | Kodaverdian |
| 5,769,489 | A | 6/1998 | Dellanno |
| 5,826,938 | A | 10/1998 | Yanase et al. |
| 5,836,648 | A | 11/1998 | Karschin et al. |
| 5,902,014 | A | 5/1999 | Dinkel et al. |
| 5,913,568 | A | 6/1999 | Brightbill et al. |
| 5,951,039 | A | 9/1999 | Severinski et al. |
| 6,024,406 | A | 2/2000 | Charras et al. |
| 6,062,642 | A | 5/2000 | Sinnhuber et al. |
| 6,145,925 | A | 11/2000 | Eksin et al. |
| 6,155,593 | A | 12/2000 | Kimura et al. |
| 6,179,379 | B1 | 1/2001 | Andersson |
| 6,189,966 | B1 | 2/2001 | Faust et al. |
| 6,196,627 | B1 | 3/2001 | Faust et al. |
| 6,206,466 | B1 | 3/2001 | Komatsu |
| 6,217,062 | B1 | 4/2001 | Breyvogel et al. |
| 6,220,661 | B1 | 4/2001 | Peterson |
| 6,224,150 | B1 | 5/2001 | Eksin et al. |
| 6,296,308 | B1 | 10/2001 | Cosentino et al. |
| 6,312,050 | B1 | 11/2001 | Eklind |
| 6,349,993 | B1 * | 2/2002 | Walsh ..................... 297/466 |
| 6,357,827 | B1 | 3/2002 | Brightbill et al. |
| 6,364,414 | B1 | 4/2002 | Specht |
| 6,375,269 | B1 | 4/2002 | Maeda et al. |
| 6,394,546 | B1 | 5/2002 | Knoblock et al. |
| 6,454,353 | B1 | 9/2002 | Knaus |
| 6,523,892 | B1 | 2/2003 | Kage et al. |
| 6,550,856 | B1 | 4/2003 | Ganser et al. |
| 6,565,150 | B2 | 5/2003 | Fischer et al. |
| 6,619,605 | B2 | 9/2003 | Lambert |
| 6,682,140 | B2 | 1/2004 | Minuth et al. |
| 6,695,406 | B2 | 2/2004 | Plant |
| 6,698,832 | B2 | 3/2004 | Boudinot |
| 6,736,452 | B2 | 5/2004 | Aoki et al. |
| 6,758,522 | B2 | 7/2004 | Ligon, Sr. et al. |
| 6,786,542 | B1 * | 9/2004 | Nuzzarello ............... 297/201 |
| 6,808,230 | B2 | 10/2004 | Buss et al. |
| 6,824,212 | B2 | 11/2004 | Malsch et al. |
| 6,848,742 | B1 | 2/2005 | Aoki et al. |
| 6,860,559 | B2 | 3/2005 | Schuster, Sr. et al. |
| 6,860,564 | B2 | 3/2005 | Reed et al. |
| 6,866,339 | B2 | 3/2005 | Itoh |
| 6,869,140 | B2 | 3/2005 | White et al. |
| 6,890,029 | B2 | 5/2005 | Svantesson |
| 6,938,953 | B2 | 9/2005 | Håland et al. |
| 6,955,399 | B2 | 10/2005 | Hong |
| 6,962,392 | B2 | 11/2005 | O'Connor |
| 6,988,770 | B2 | 1/2006 | Witchie |
| 6,997,473 | B2 | 2/2006 | Tanase et al. |
| 7,040,699 | B2 | 5/2006 | Curran et al. |
| 7,100,992 | B2 | 9/2006 | Bargheer et al. |
| 7,131,694 | B1 | 11/2006 | Buffa |
| 7,159,934 | B2 | 1/2007 | Farquhar et al. |
| 7,185,950 | B2 | 3/2007 | Pettersson et al. |
| 7,213,876 | B2 | 5/2007 | Stoewe |
| 7,229,118 | B2 | 6/2007 | Saberan et al. |
| 7,261,371 | B2 | 8/2007 | Thunissen et al. |
| 7,344,189 | B2 | 3/2008 | Reed et al. |
| 7,350,859 | B2 | 4/2008 | Klukowski |
| 7,350,865 | B2 | 4/2008 | Pearse |
| 7,387,339 | B2 * | 6/2008 | Bykov et al. ............... 297/312 |
| 7,393,005 | B2 | 7/2008 | Inazu et al. |
| 7,425,034 | B2 | 9/2008 | Bajic et al. |
| 7,441,838 | B2 | 10/2008 | Patwardhan |
| 7,467,823 | B2 | 12/2008 | Hartwich |
| 7,478,869 | B2 | 1/2009 | Lazanja et al. |
| 7,481,489 | B2 | 1/2009 | Demick |
| 7,506,924 | B2 | 3/2009 | Bargheer et al. |
| 7,506,938 | B2 | 3/2009 | Brennan et al. |
| 7,530,633 | B2 | 5/2009 | Yokota et al. |
| 7,543,888 | B2 | 6/2009 | Kuno |
| 7,578,552 | B2 | 8/2009 | Bajic et al. |
| 7,597,398 | B2 | 10/2009 | Lindsay |
| 7,614,693 | B2 | 11/2009 | Ito |
| 7,641,281 | B2 | 1/2010 | Grimm |
| 7,669,925 | B2 | 3/2010 | Beck et al. |
| 7,669,928 | B2 | 3/2010 | Snyder |
| 7,712,833 | B2 | 5/2010 | Ueda |
| 7,717,459 | B2 | 5/2010 | Bostrom et al. |
| 7,726,733 | B2 | 6/2010 | Balser et al. |
| 7,735,932 | B2 | 6/2010 | Lazanja et al. |
| 7,752,720 | B2 | 7/2010 | Smith |
| 7,753,451 | B2 | 7/2010 | Maebert et al. |
| 7,775,602 | B2 | 8/2010 | Lazanja et al. |
| 7,784,863 | B2 | 8/2010 | Fallen |
| 7,802,843 | B2 | 9/2010 | Andersson et al. |
| 7,819,470 | B2 | 10/2010 | Humer et al. |
| 7,823,971 | B2 | 11/2010 | Humer et al. |
| 7,845,729 | B2 | 12/2010 | Yamada et al. |
| 7,857,381 | B2 | 12/2010 | Humer et al. |
| 7,871,126 | B2 | 1/2011 | Becker et al. |
| 7,891,701 | B2 | 2/2011 | Tracht et al. |
| 7,909,360 | B2 | 3/2011 | Marriott et al. |
| 7,931,294 | B2 | 4/2011 | Okada et al. |
| 7,931,330 | B2 | 4/2011 | Itou et al. |
| 7,946,649 | B2 | 5/2011 | Galbreath et al. |
| 7,963,553 | B2 | 6/2011 | Huynh et al. |
| 7,963,595 | B2 | 6/2011 | Ito et al. |
| 7,963,600 | B2 | 6/2011 | Alexander et al. |
| 7,971,931 | B2 | 7/2011 | Lazanja et al. |
| 7,971,937 | B2 | 7/2011 | Ishii et al. |
| 8,011,726 | B2 | 9/2011 | Omori et al. |
| 8,016,355 | B2 | 9/2011 | Ito et al. |
| 8,029,055 | B2 | 10/2011 | Hartlaub |
| 8,038,222 | B2 | 10/2011 | Lein et al. |
| 8,075,053 | B2 | 12/2011 | Tracht et al. |
| 8,109,569 | B2 | 2/2012 | Mitchell |
| 8,123,246 | B2 | 2/2012 | Gilbert et al. |
| 8,128,167 | B2 | 3/2012 | Zhong et al. |
| 8,162,391 | B2 | 4/2012 | Lazanja et al. |
| 8,162,397 | B2 | 4/2012 | Booth et al. |
| 8,167,370 | B2 | 5/2012 | Arakawa et al. |
| 8,210,568 | B2 | 7/2012 | Ryden et al. |
| 8,210,605 | B2 | 7/2012 | Hough et al. |
| 8,210,611 | B2 | 7/2012 | Aldrich et al. |
| 8,226,165 | B2 | 7/2012 | Mizoi |
| 8,342,607 | B2 | 1/2013 | Hofmann et al. |
| 8,585,144 | B2 * | 11/2013 | Huttenhuis ............... 297/312 |
| 2004/0195870 | A1 | 10/2004 | Bohlender et al. |
| 2005/0200166 | A1 | 9/2005 | Noh |
| 2006/0043777 | A1 | 3/2006 | Friedman et al. |
| 2007/0029853 | A1 * | 2/2007 | Forgatsch et al. ........ 297/284.11 |
| 2007/0120401 | A1 | 5/2007 | Minuth et al. |
| 2008/0174159 | A1 | 7/2008 | Kojima et al. |
| 2009/0066122 | A1 | 3/2009 | Minuth et al. |
| 2009/0165263 | A1 | 7/2009 | Smith |
| 2009/0322124 | A1 | 12/2009 | Barkow et al. |
| 2010/0038937 | A1 | 2/2010 | Andersson et al. |
| 2010/0140986 | A1 | 6/2010 | Sawada |
| 2010/0171346 | A1 | 7/2010 | Laframboise et al. |
| 2010/0187881 | A1 | 7/2010 | Fujita et al. |
| 2010/0201167 | A1 | 8/2010 | Wieclawski |
| 2010/0231013 | A1 | 9/2010 | Schlenker |
| 2010/0270840 | A1 | 10/2010 | Tanaka et al. |
| 2010/0301650 | A1 | 12/2010 | Hong |
| 2010/0320816 | A1 | 12/2010 | Michalak |
| 2011/0018498 | A1 | 1/2011 | Soar |

(56) References Cited

U.S. PATENT DOCUMENTS

| | | |
|---|---|---|
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0032486 A1 | 2/2012 | Baker et al. |
| 2012/0037754 A1 | 2/2012 | Kladde |
| 2012/0049597 A1 | 3/2012 | Brewer et al. |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2013/0076092 A1 | 3/2013 | Kulkarni et al. |
| 2015/0108816 A1* | 4/2015 | Dry et al. ............ 297/423.19 |

FOREIGN PATENT DOCUMENTS

| | | |
|---|---|---|
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

ecoustics.com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

* cited by examiner

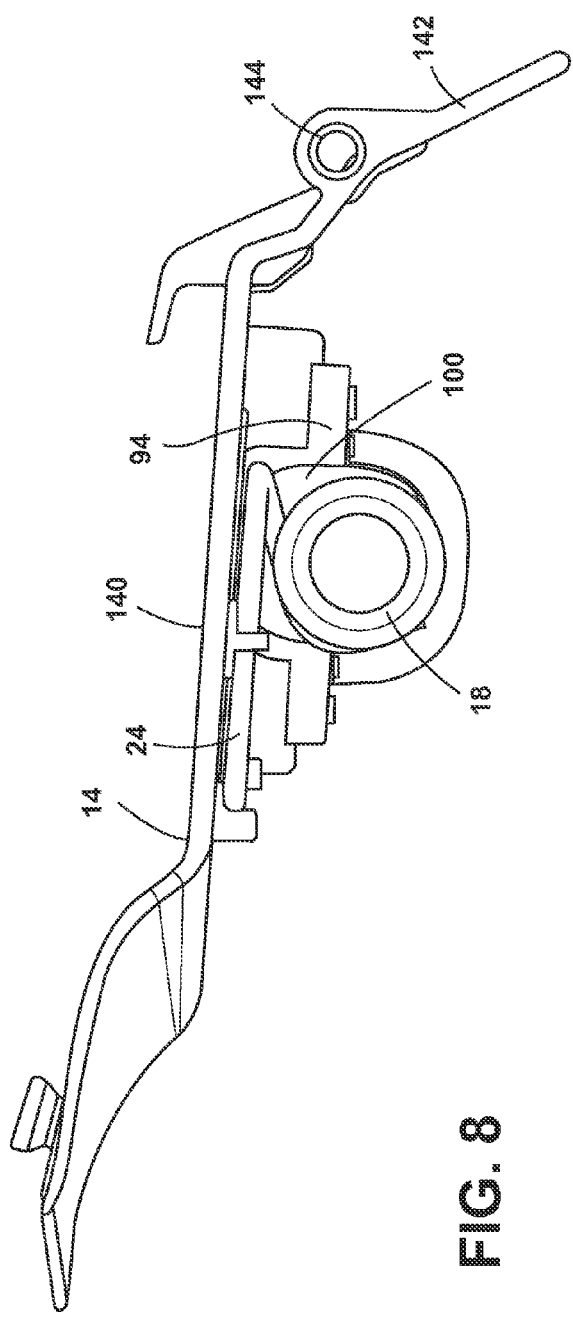
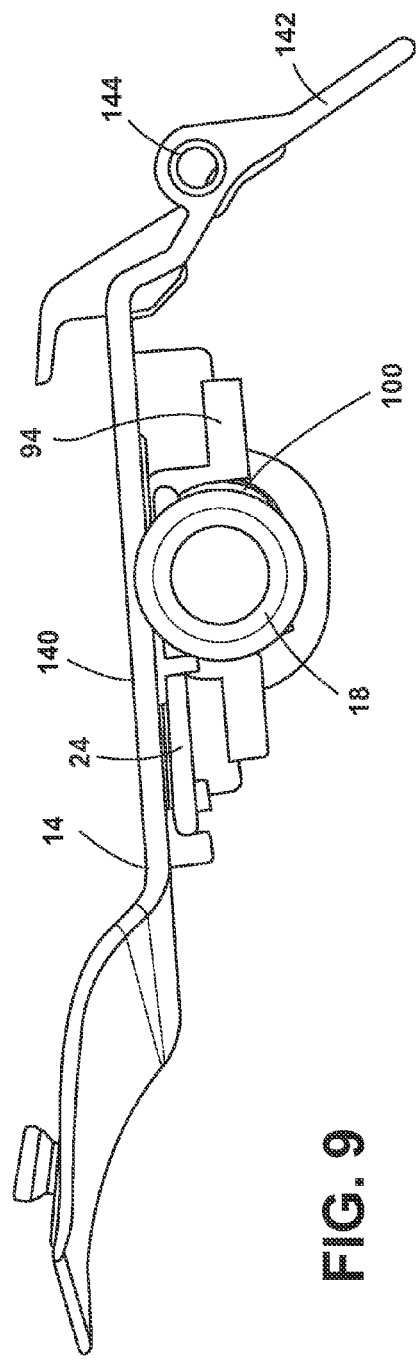

VEHICLE SEATING ASSEMBLY WITH MANUAL INDEPENDENT THIGH SUPPORTS

FIELD

The present disclosure generally relates to a vehicle seating assembly, and more particularly to a vehicle seating assembly having manual thigh supports.

BACKGROUND

Modern vehicle seats are becoming more and more comfortable as our understanding of human ergonomics, posture, and comfortability increases. Vehicle seating assemblies that include comfort components in the vehicle seat back and the vehicle seat can provide drivers and passengers with improved comfort and increased endurance for extensive vehicle rides. Additionally, accommodating the various sizes, shapes, and desired sitting style of drivers and passengers can prove challenging when providing vehicle seating assemblies. Accordingly, vehicle seating assemblies that include components to accommodate the different sizes and shapes of drivers and passengers, as well as the desired posture and sitting positions of those drivers and passengers, has become increasingly important.

SUMMARY

According to one aspect of the present disclosure, a vehicle seating assembly includes a seat base. First and second independent thigh supports are pivotally coupled to the seat base. A support rod extends below the first and second independent thigh supports and is operably coupled to each of the first and second independent thigh supports by a gasket member and a bracket. A first spring member includes a body portion in abutting contact with an underside of the first independent thigh support and includes legs engaged with the support rod. The first spring member biases the first independent thigh support to a raised position. A second spring member includes a body portion in abutting contact with an underside of the second independent thigh support and includes legs engaged with the support rod. The second spring member biases the second independent thigh support to a raised position.

According to another aspect of the present disclosure, a vehicle seating assembly includes first and second independently movable thigh supports operably coupled to a vehicle seat. A support member extends below the first and second independently movable thigh supports and is operably coupled to each of the first and second independently movable thigh supports. A first spring member includes a first portion engaged with the first independently movable thigh support and a second portion engaged with the support member. A second spring member includes a first portion engaged with the second independently movable thigh support and a second portion engaged with the support member.

According to yet another aspect of the present disclosure, a vehicle seating assembly includes first and second independent thigh supports pivotally coupled to a seat base. A support rod is operably coupled to each of the first and second independent thigh supports by a bracket assembly. A first spring member is engaged with the support rod and is configured to bias the first independent thigh support upward. A second spring member is engaged with the support rod and is configured to bias the second independent thigh support upward.

According to still another aspect of the present disclosure, a vehicle seating assembly includes a seat with a seat base. The seat is configured to provide independent support to each leg of a passenger by utilization of independent thigh supports located in front of the seat base. The independent thigh supports are biased to a raised position by spring members and are rotatable relative to the seat base.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 8 is a side elevational view of one of the independent thigh supports of the vehicle seating assembly in a raised position; and FIG. 9 is a side elevational view of the vehicle seating assembly in a lowered position.

DETAILED DESCRIPTION OF THE EMBODIMENTS

Figure 1:
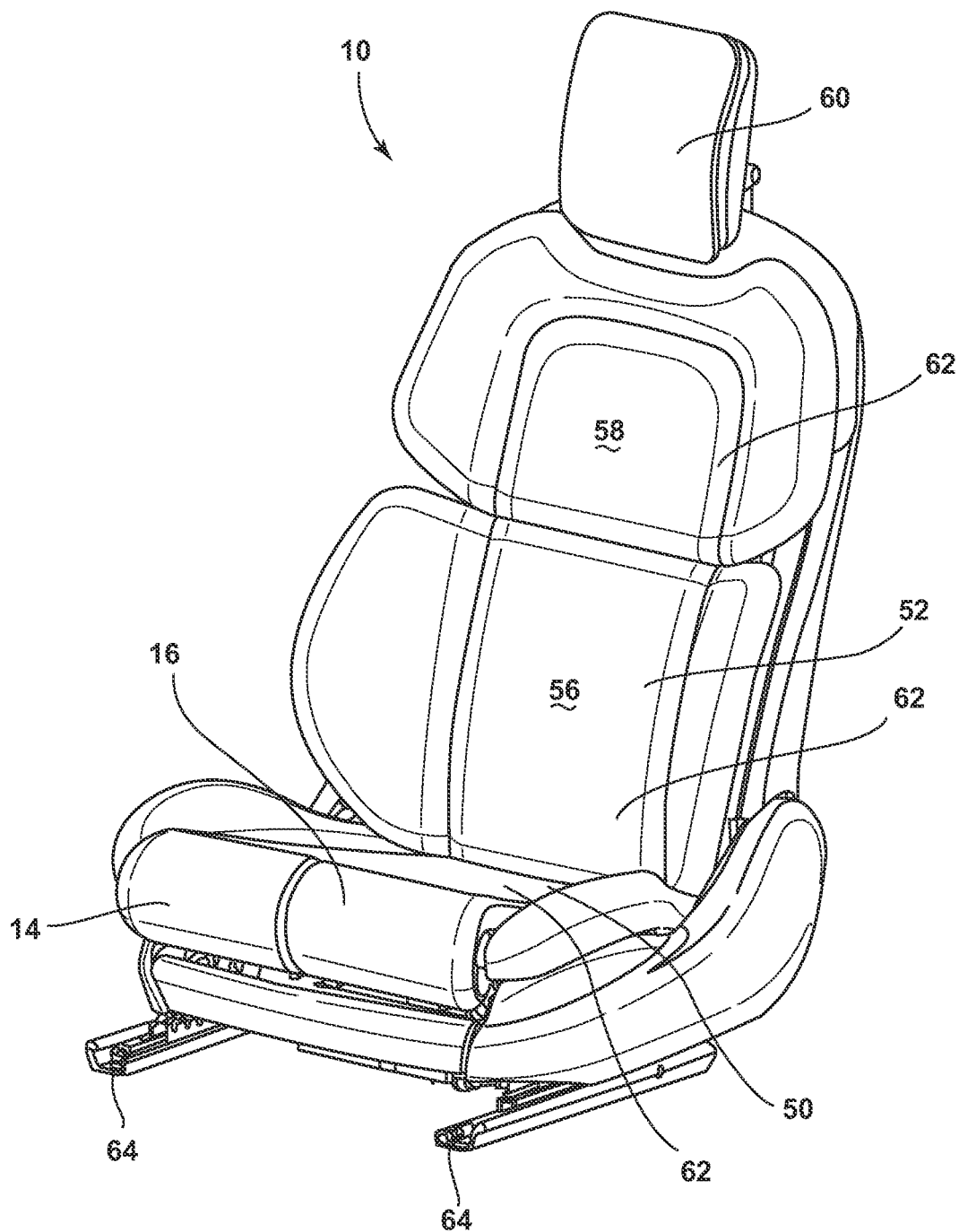
FIG. 1 is a front perspective view of a vehicle seating assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiments shown in FIGS. 1-9, reference numeral 10 generally designates a vehicle seating assembly having a seat base 12. First and second independent thigh supports 14, 16 are pivotally coupled to the seat base 12. A support rod 18 extends below the first and second independent thigh supports 14, 16 and is operably coupled to each of the first and second independent thigh supports 14, 16 by a gasket member 20. A first spring member 24 includes a body portion 26 in abutting contact with an underside 28 of the first independent thigh support 14 and includes legs 30 engaged with the support rod 18. The first spring member 24 biases the first independent thigh support 14 to a raised position. A second spring member 32 includes the body portion 26 in abutting contact with an underside 36 of the second independent thigh support 16 and includes legs 30 engaged with the support rod 18. The second spring member 32 biases the second independent thigh support 16 to a raised position.

With reference to FIG. 1, the vehicle seating assembly 10 is generally defined by a seat 50 and a seatback 52. The seat 50 is defined by the seat base 12 and the first and second independent thigh supports 14, 16 that supports the first and second independent thigh supports 14, 16. The seat base 12 is disposed behind the first and second independent thigh supports 14, 16. The seatback 52 extends from a rearward portion of the seat base 12 upwardly. The seatback 52 includes a lower lumbar support 56, an upper thoracic support 58, and a headrest or a head restraint 60. Both the seat 50 and the seatback 52 include cushion assemblies 62 designed to cradle the body of a passenger during travel. The entire vehicle seating assembly 10 is disposed over rail slides 64 designed to move the vehicle seating assembly 10 forward and rearward relative to the vehicle. In addition, the vehicle seating assembly 10 may include functionality that allows for raising and lowering of the vehicle seating assembly 10 relative to the vehicle.

Figure 2:
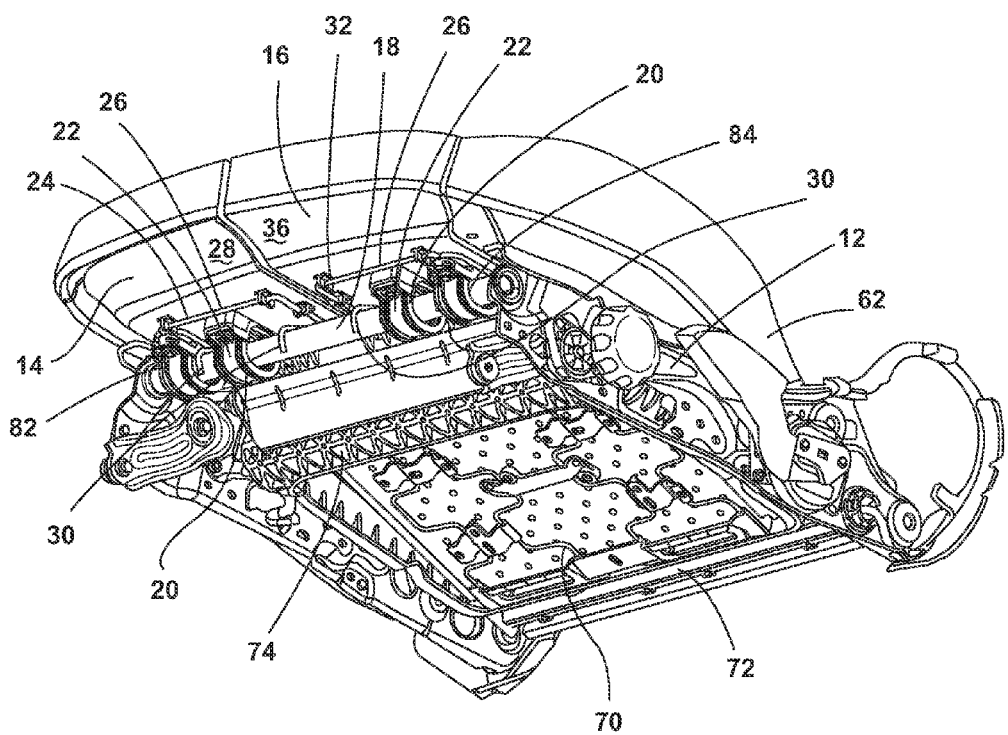
FIG. 2 is a bottom perspective view of a seat of the vehicle seating assembly of FIG. 1.
Figure 3:
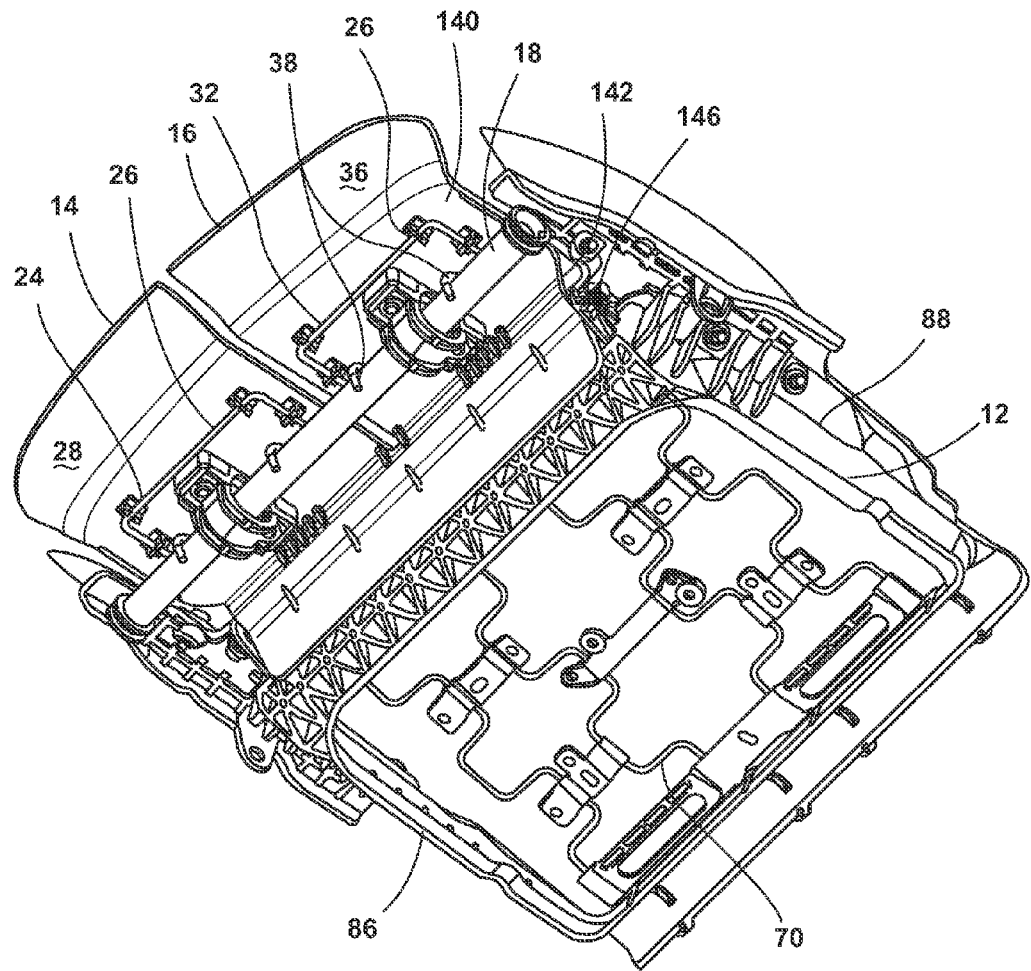
FIG. 3 is a bottom perspective view of a portion of the seat of the vehicle seating assembly of FIG. 2.

With reference to FIGS. 2 and 3, the seat base 12 includes a spring assembly 70 that provides flexible support to the buttocks of a passenger. The spring assembly 70 is operably coupled to a rearward portion 72 and a forward portion 74 of the seat base 12. One of the cushion assemblies 62 is disposed above the spring assembly 70. The support rod 18 is disposed in front of the seat base 12. The support rod 18 is disposed below the first and second independent thigh supports 14, 16. The support rod 18 is held in place by first and second retaining gaskets 82, 84 that are operably coupled to first and second seat side supports 86, 88. The first and second independent thigh supports 14, 16 interact with the support rod 18 in two ways. The support rod 18 engages with the first and second independent thigh supports 14, 16 via the first and second spring members 24, 32 that bias the first and second independent thigh supports 14, 16 upward relative to the support rod 18. In addition, the first and second independent thigh supports 14, 16 are loosely connected to the support rod 18 via the gasket members 20. The gasket members 20, together with braces 94, generally define an enlarged opening 100 through which the support rod 18 extends. The enlarged opening 100 is larger than an outside diameter of the support rod 18. The loose engagement of the support rod 18 with the enlarged opening 100 allows for movement of the support rod 18 inside the enlarged opening 100, the significance of which is discussed in greater detail herein.

Figure 4:
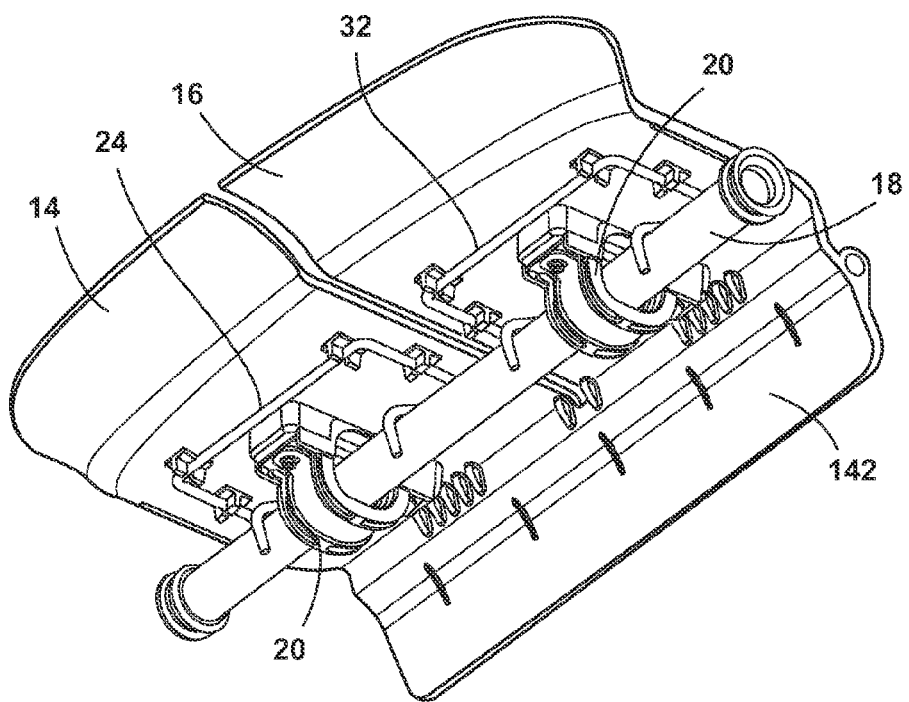
FIG. 4 is a bottom perspective view of a support rod and independent thigh supports of the vehicle seating assembly of FIG. 2.
Figure 5:
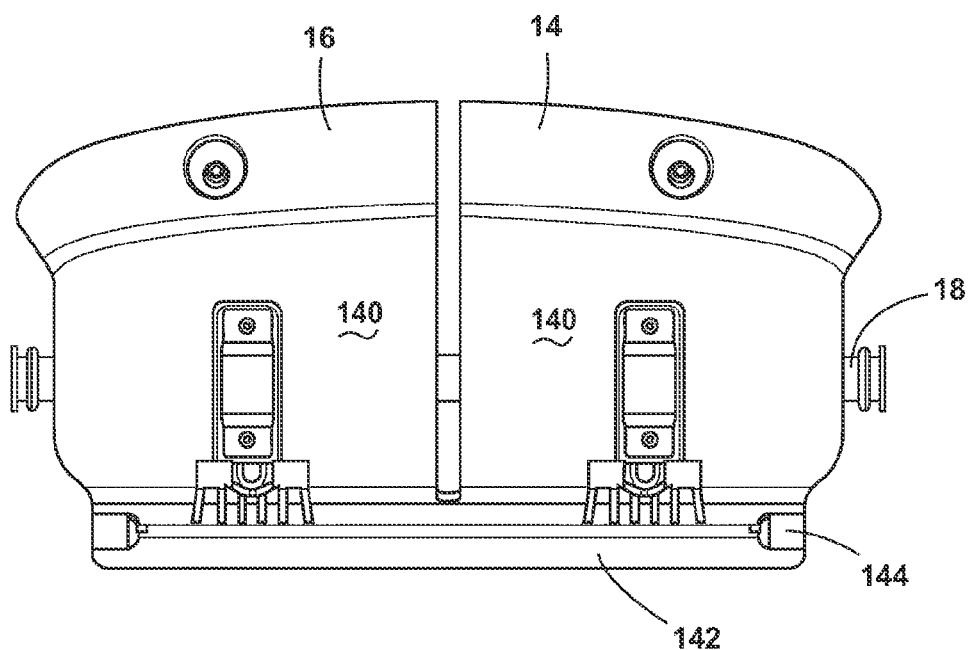
FIG. 5 is a top elevational view of the independent thigh supports of FIG. 4.
Figure 6:
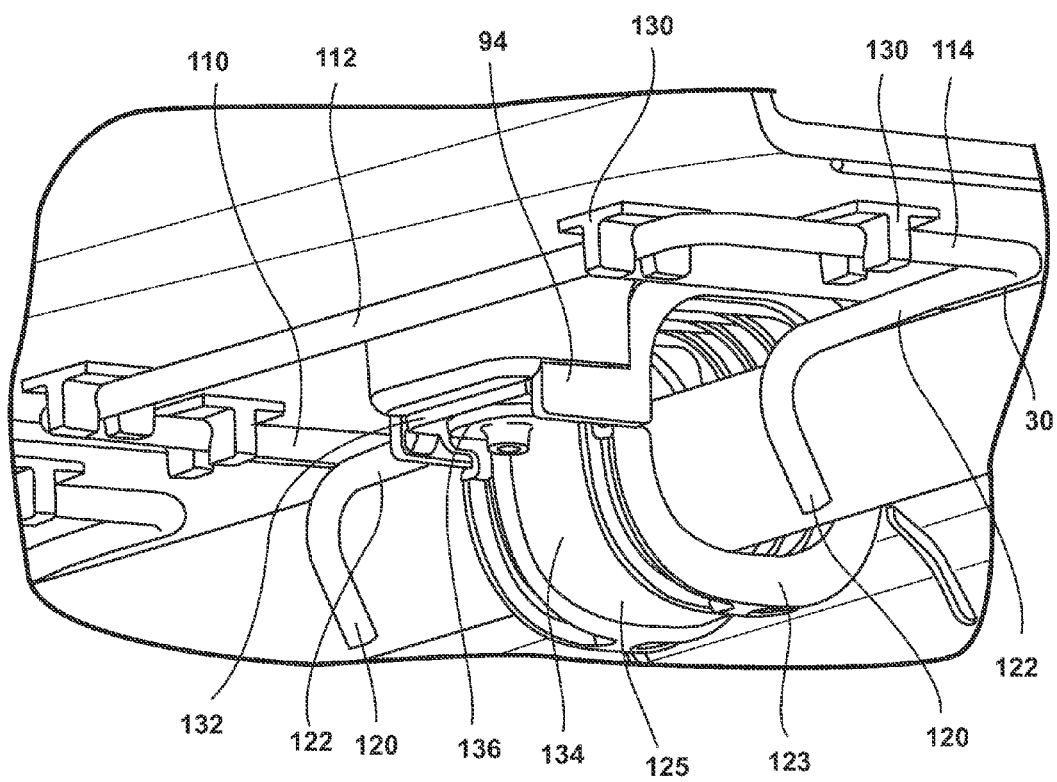
FIG. 6 is an enlarged partial front perspective view of an underside of the independent thigh supports of FIG. 4.
Figure 7:
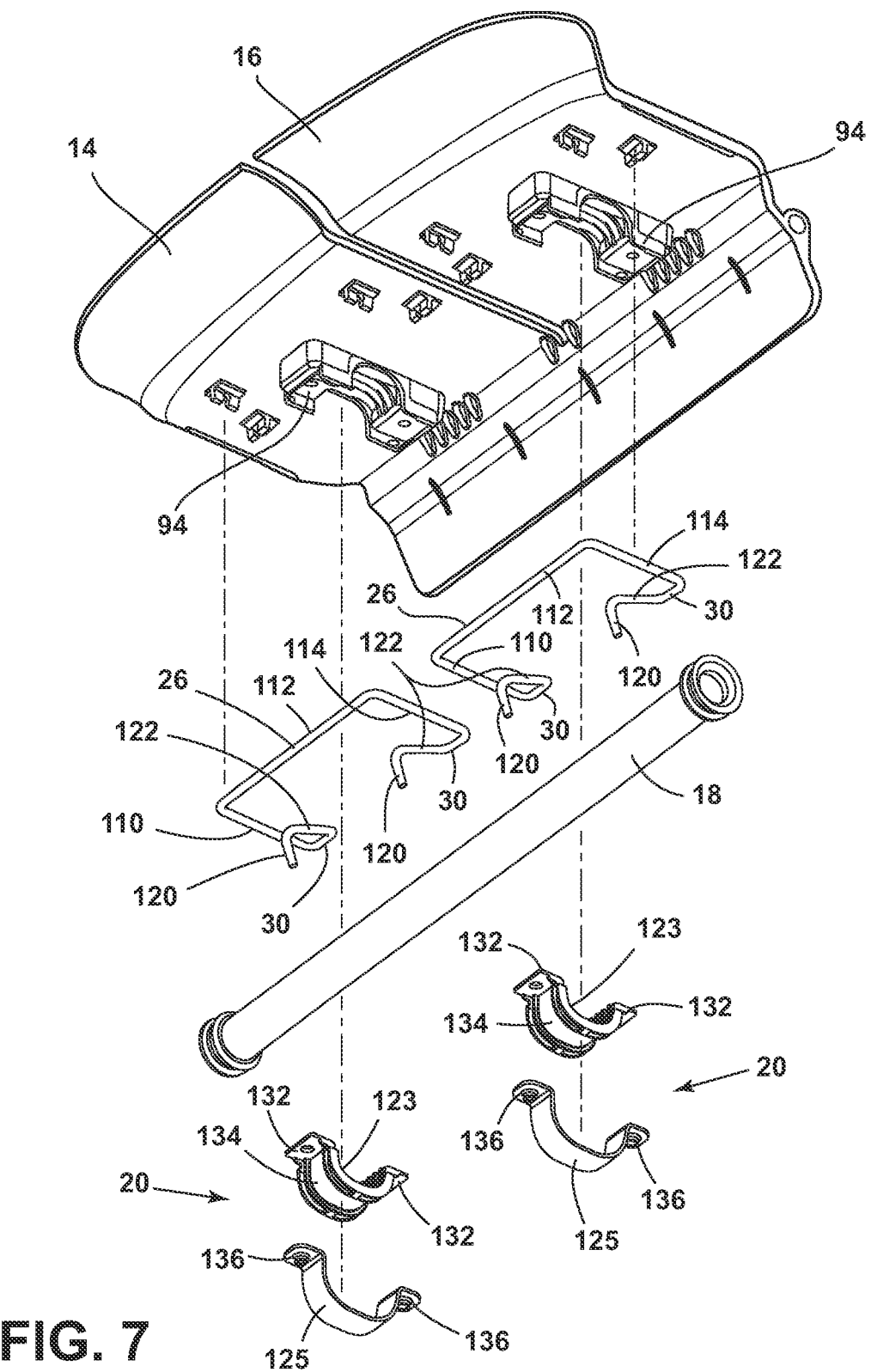
FIG. 7 is an exploded bottom perspective view of the independent thigh supports of FIG. 4.

With reference to FIGS. 4, 6, and 7, the illustrated embodiment of the first and second spring members 24, 32 includes the body portion 26 of the first and second spring members 24, 32 having first, second, and third segments 110, 112, 114. Each of the first, second, and third segments 110, 112, 114 are generally aligned in a coplanar arrangement. The legs 30 of the first and second spring members 24, 32 extend downwardly from the body portion 26, and more specifically from the first and third segments 110, 114 of the body portion 26. The legs 30 extend in a direction angled downwardly away from the planar extent of the body portion 26. A distal end 120 of each leg 30 includes a downwardly extending segment that protrudes substantially orthogonal relative to a proximal end 122 of the leg 30. As shown in FIGS. 4 and 6, the proximal end and the distal portion of each leg 30 engages with a top portion of the support rod 18. Each of the first and second spring members 24, 32 biases the first and second independent thigh supports 14, 16 upwardly relative to the support rod 18. As discussed herein, a passenger can adjust the first and second independent thigh supports 14, 16 relative to the support rod 18 to accommodate the preference of the passenger.

Further, as noted in FIGS. 4 and 6, the gasket members 20 each include a gasket 123 and a securing bracket 125 disposed over the gasket 123. The gasket members 20, together with the braces 94 disposed on the undersides 28, 36 of the first and second independent thigh supports 14, 16, defines the enlarged opening 100 that retains the support rod 18. In addition, as shown in FIGS. 4 and 6, snap clips 130 are disposed on the undersides 28, 36 of each of the first and second independent thigh supports 14, 16, and are generally configured to receive the body portion 26 of the first and second spring members 24, 32 and retain the body portion 26. Notably, each of the gasket members 20 includes a securing flange 132 configured to be received inside a receiving slot 134 of each of the braces 94. Likewise, each of the braces 94 includes a securing flange 136 configured to receive a mechanical fastener, thereby securing the braces 94 and the gasket members 20 to the braces 94.

In the illustrated embodiment, the body portion 26 of the first and second spring members 24, 32 is securely engaged with the undersides 28, 36 of the first and second independent thigh supports 14, 16, respectively, by a fastenerless snap-fit connection. However, it is also contemplated that the body portion 26 of the first and second spring members 24, 32 may be secured in other manners, or integrally molded into the first and second independent thigh supports 14, 16. In addition, the legs 30 of the first and second spring members 24, 32 are illustrated as wrapping around a top and front area of the support rod 18. This will be understood to be one example of the concept disclosed herein. It is also contemplated that other spring members, such as coil springs or leaf springs, may also be utilized to bias the first and second independent thigh supports 14, 16 upwardly relative to the support rod 18. The first and second spring members 24, 32 act to bias the first and second independent thigh supports 14, 16 away from the support rod 18. More specifically, the first and second spring members 24, 32 bias the first and second independent thigh supports 14, 16, respectively, upward into contact with an underside of the legs of a passenger.

Each of the gasket members 20 includes a C-shaped construction configured to extend around a bottom of the support rod 18. The first and second independent thigh supports 14, 16 are configured to rotate approximately 8 degrees between a fully raised position (approximately 8 degrees) and a fully lowered position (0 degrees). The first and second independent thigh supports 14, 16 include a lateral wall 140 configured to support the legs of a passenger and a downwardly extending pivot wall 142 with a pivot aperture 144 configured to receive a pivot pin 146, about which each of the first and second independent thigh supports 14, 16 rotate. It is generally contemplated that the pivot pin may extend through a piano-type hinge mechanism, allowing for independent movement of the first and second independent thigh supports 14, 16, or synchronized movement of the first and second independent thigh supports 14, 16. It is generally contemplated that the recesses formed on the undersides 28, 36 of the first and second independent thigh supports 14, 16 may be defined by outwardly extending braces configured to engage the brackets and gasket members.

The disclosure set forth herein describes a vehicle seating assembly that provides exceptional comfort to a passenger and independent control of support to each leg of a passenger. The vehicle seating assembly can be manually or automatically adjusted via a motor to accommodate passengers of various sizes and also create additional comfort for long travel. The versatility and the simplicity of the concepts noted above provide for a robust and durable vehicle seating assembly that can be manufactured at minimal costs.

It will also be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
   a seat base;
   first and second independent thigh supports pivotally coupled to the seat base;
   a support rod extending below the first and second independent thigh supports and operably coupled to each of the first and second independent thigh supports by a gasket member and a bracket, the first and second independent thigh supports configured to rotate about a rear pivot pin;
   a first spring member having an elongate body portion in abutting contact with and extending across an underside of the first independent thigh support and having legs engaged with the support rod, wherein the first spring member biases the first independent thigh support to a raised position; and
   a second spring member having an elongate body portion in abutting contact with and extending across an underside of the second independent thigh support and having legs engaged with the support rod, wherein the second spring member biases the second independent thigh support to a raised position, wherein the underside of each of the first independent thigh support and the second independent thigh support includes recesses configured to receive the support rod.

2. The vehicle seating assembly of claim 1, wherein the body portion of the first and second spring members is securely engaged with the underside of the first and second independent thigh supports, respectively, by a fastenerless snap-fit connection.

3. The vehicle seating assembly of claim 1, wherein the legs of the first and second spring members wrap around a top and front area of the support rod.

4. The vehicle seating assembly of claim 1, wherein the first and second spring members bias the first and second independent thigh supports, respectively, away from the support rod.

5. The vehicle seating assembly of claim 1, wherein each gasket member includes a C-shaped construction configured to extend around a bottom of the support rod.

6. The vehicle seating assembly of claim 1, wherein the first and second independent thigh supports are configured to rotate approximately 8 degrees between fully raised and lowered positions.

7. The vehicle seating assembly of claim 1, wherein the first and second independent thigh supports include a downwardly extending pivot wall configured to receive a pivot pin about which each of the first and second independent thigh supports rotate.

8. A vehicle seating assembly comprising:
   first and second independently movable thigh supports operably coupled to a vehicle seat;
   a single member extending transversely below the first and second independently movable thigh supports and operably coupled to each of the first and second independently movable thigh supports;
   a bracket assembly disposed below each of the first and second independently movable thigh supports and completely encircling the support member, the bracket assembly defining an enlarged aperture that allows limited vertical movement of the first and second independently movable thigh supports, wherein the bracket assembly of the first independently movable thigh support moves vertically with the first independently movable thigh support, and the bracket assembly of the second independently movable thigh support moves vertically with the second independently movable thigh support;
   a first spring member having a first portion engaged with the first independently movable thigh support and a second portion engaged with the support member; and
   a second spring member having a first portion engaged with the second independently movable thigh support and a second portion engaged with the support member.

9. The vehicle seating assembly of claim 8, wherein a body portion of the first and second spring members is securely engaged with the underside of the first and second independently movable thigh supports, respectively, by a fastenerless snap-fit connection.

10. The vehicle seating assembly of claim 8, wherein the first and second spring members bias the first and second independently movable thigh supports, respectively, away from the support rod.

11. The vehicle seating assembly of claim 8, wherein legs of the first and second spring members wrap around a top and front area of a support rod.

12. The vehicle seating assembly of claim 11, wherein the underside of each of the first independently movable thigh support and the second independently movable thigh support include recesses configured to receive the support rod.

13. The vehicle seating assembly of claim 11, further comprising:
 a gasket member having a C-shaped construction configured to extend around a bottom of the support rod.

14. The vehicle seating assembly of claim 8, wherein the first and second independently movable thigh supports are configured to rotate approximately 8 degrees between fully raised and lowered positions.

15. The vehicle seating assembly of claim 8, wherein the first and second independently movable thigh supports include a downwardly extending pivot wall configured to receive a pivot pin about which each of the first and second independently movable thigh supports rotate.

* * * * *